(12) United States Patent
Luo et al.

(10) Patent No.: US 11,307,563 B2
(45) Date of Patent: Apr. 19, 2022

(54) OBSERVATION APPARATUS, OBSERVATION METHOD AND OBSERVATION PROGRAM

(71) Applicant: FANUC CORPORATION, Yamanashi (JP)

(72) Inventors: Wei Luo, Yamanashi (JP); Junichi Tezuka, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 575 days.

(21) Appl. No.: 16/356,140

(22) Filed: Mar. 18, 2019

(65) Prior Publication Data

US 2019/0310613 A1    Oct. 10, 2019

(30) Foreign Application Priority Data

Apr. 9, 2018 (JP) .............................. JP2018-074555

(51) Int. Cl.
*G05B 19/418* (2006.01)

(52) U.S. Cl.
CPC ... *G05B 19/4183* (2013.01); *G05B 19/41835* (2013.01)

(58) Field of Classification Search
CPC .......... G05B 19/4183; G05B 19/41835; G05B 2219/49071; G05B 19/4068
See application file for complete search history.

(56) References Cited

U.S. PATENT DOCUMENTS 6,297,742 B1 * 10/2001 Canada ................ G01R 31/343
                                                          318/490

FOREIGN PATENT DOCUMENTS

| JP | 2011-39708  | 2/2011 |
| JP | 2014-164597 | 9/2014 |
| JP | 2015-52846  | 3/2015 |
| JP | 2015-135649 | 7/2015 |
| JP | 2016-045878 | 4/2016 |

OTHER PUBLICATIONS

Notification of Reasons for Refusal dated May 26, 2020 in corresponding Japanese Patent Application No. 2018-074555.

* cited by examiner

*Primary Examiner* — Manuel A Rivera Vargas
(74) *Attorney, Agent, or Firm* — Wenderoth, Lind & Ponack, L.L.P.

(57) ABSTRACT

To provide an observation apparatus, an observation method, and an observation program capable of presenting a point of interest for finding a wasteful waiting time of a machine. The observation apparatus includes an observation data acquisition unit configured to acquire observation data on an operation status of a machine along with time information, an extraction unit configured to extract, on the basis of a first condition relating to the observation data, a time range of the observation data corresponding to an operation of the machine, the operation having a possibility of generating a waiting time, and an output unit configured to output information on the extracted time range.

9 Claims, 3 Drawing Sheets

OBSERVATION APPARATUS, OBSERVATION METHOD AND OBSERVATION PROGRAM

This application is based on and claims the benefit of priority from Japanese Patent Application No. 2018-074555, filed on 9 Apr. 2018, the content of which is incorporated herein by reference.

BACKGROUND OF THE INVENTION

Field of the Invention

The present invention relates to an apparatus, a method and a program for observing an operation status of an industrial machine (hereinafter, also referred to as "machine") including a machine tool and an industrial robot.

Related Art

In the case where an operation status of a machine tool to be grasped as an example, operation waveforms of a feed axis, a spindle and the like are generally measured and analyzed in a conventional manner. However, it is difficult to grasp how the machine tool actually behaves only on the basis of the waveforms. To address this, for example, Patent Document 1 proposes a technique of displaying operation status data and block numbers included in a machining program in association with each other. Patent Document 2 proposes a technique of mutually retrieving a position of a waveform and a block number included in a machining program.

Patent Document 1: Japanese Unexamined Patent Application, Publication No. 2015-52846
Patent Document 2: Japanese Unexamined Patent Application, Publication No. 2011-39708

SUMMARY OF THE INVENTION

In order to shorten a cycle time in machining, time-series operation waveforms of a feed axis, a spindle and the like need to be acquired, and a user has to find and eliminate a wasteful waiting time. In many cases, a waiting time occurs during tool exchange, timing adjustment with peripheral equipment, or the like. However, it is difficult to grasp, simply by referring to the waveforms of the measured operation of axes, which part corresponds to the waiting time. It is also a burden on the user to check, in order, the points each at which a waiting time may occur.

The object of the present invention is to provide an observation apparatus, an observation method, and an observation program capable of presenting a point of interest for finding a wasteful waiting time of a machine.

(1) An observation apparatus (for example, an observation apparatus 1 to be described below) according to the present invention includes an observation data acquisition unit (for example, an observation data acquisition unit 11 to be described below) configured to acquire observation data on an operation status of a machine along with time information, an extraction unit (for example, an extraction unit 13 to be described below) configured to extract, on a basis of a first condition relating to the observation data, a time range of the observation data corresponding to an operation of the machine, the operation having a possibility of generating a waiting time, and an output unit (for example, an output unit 14 to be described below) configured to output information on the time range.

(2) The observation apparatus according to (1) may include an execution status acquisition unit (for example, an execution status acquisition unit 12 to be described below) configured to acquire execution status data including an execution position and a specific parameter value from an instruction program with respect to the machine, along with time information. The extraction unit may specify the execution status data satisfying a second condition relating to the execution status data, and may extract the time range corresponding to the time information of the specified execution status data and also satisfying the first condition.

(3) In the observation apparatus according to (1) or (2), the first condition may indicate at least one operation of tool exchange, spindle speed reaching target speed, timing adjustment with peripheral equipment, feed axis reaching in-position, and completion of auxiliary operation.

(4) In the observation apparatus according to any one of (1) to (3), the extraction unit may further extract, as information on the time range, a time being adjacent to the time range and also satisfying a third condition relating to the observation data indicating the waiting time.

(5) In the observation apparatus according to any one of (1) to (4), the output unit may display, on a display, the information on the time range with a display attribute of the time range distinguished from other times.

(6) In the observation apparatus according to (5), the output unit may output the observation data as a time-series waveform graph including the time range.

(7) In the observation apparatus according to (6), the output unit may enlarge the waveform graph in any coordinate axis direction, according to a predetermined instruction input.

An observation method according to the present invention to be executed by a computer (for example, an observation apparatus 1 to be described below) includes an observation data acquisition step of acquiring observation data on an operation status of a machine, along with time information, an extraction step of extracting, on a basis of a first condition relating to the observation data, a time range of the observation data corresponding to an operation of the machine, the operation having a possibility of generating a waiting time, and an output step of outputting information on the time range.

An observation program according to the present invention to be executed by a computer (for example, an observation apparatus 1 to be described below) includes an observation data acquisition step of acquiring observation data on an operation status of a machine, along with time information, an extraction step of extracting, on a basis of a first condition relating to the observation data, a time range of the observation data corresponding to an operation of the machine, the operation having a possibility of generating a waiting time, and an output step of outputting information on the time range.

The present invention enables to present a point of interest for finding a wasteful waiting time of a machine.

DETAILED DESCRIPTION OF THE INVENTION

Figure 1:
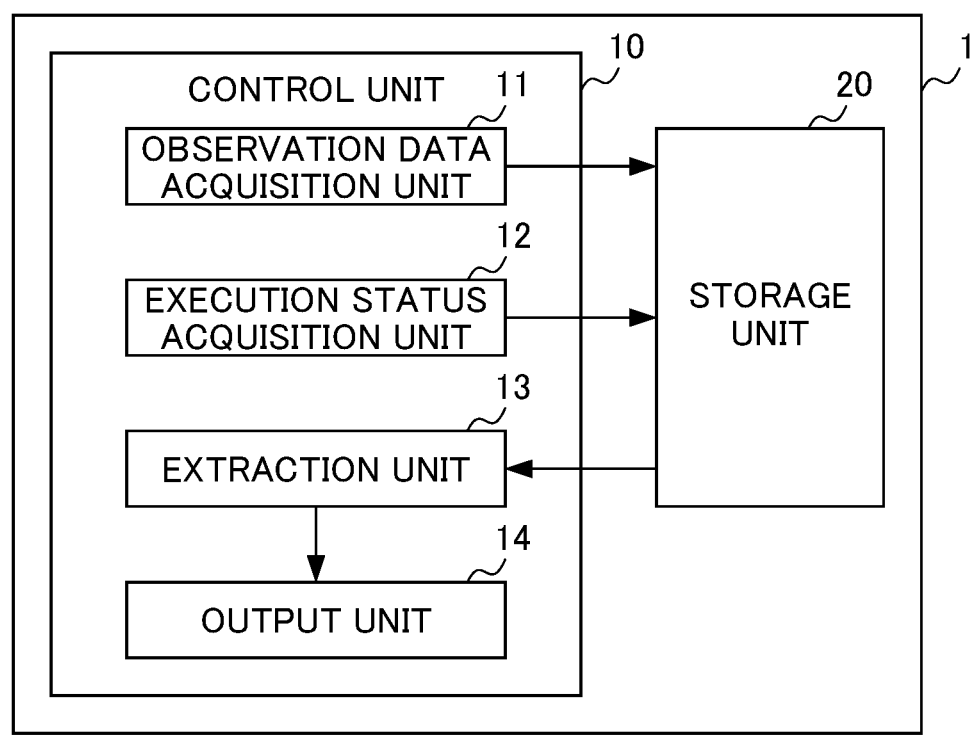
FIG. 1 is a block diagram illustrating a functional configuration of an observation apparatus according to an embodiment.

One example embodiment of the present invention will be described below. FIG. 1 is a block diagram illustrating a functional configuration of an observation apparatus 1 according to the present embodiment. The observation apparatus 1 is an information processing apparatus (computer) for outputting information by associating observation data on a machine tool as an example machine to be observed with execution status data of a machining program in which instructions to the machine tool are described. It is noted that the observation apparatus 1 may be integrated into a numerical controller for controlling a driving unit such as a servo motor and a linear motor included in a machine tool. A machine to be observed is not limited to a machine tool.

A control unit 10 of the observation apparatus 1 includes an observation data acquisition unit 11, an execution status acquisition unit 12, an extraction unit 13, and an output unit 14. The control unit 10 executes software (observation program) stored in a storage unit 20, whereby these functional units are realized.

The observation data acquisition unit 11 acquires the observation data on the actual operation status of the machine tool along with time information at a predetermined sampling cycle, and stores them in the storage unit 20. The observation data is, for example, motor control data of a spindle and a feed axis acquired in time series at a predetermined sampling cycle, including a current or voltage command value, a measured current or voltage value, a position command value, a measured position value, a rotation speed command value, a measured rotation speed value, a torque command value, a measured torque value, and the like.

A signal input/output from an external device to the numerical controller may be used as observation data. For example, a sequence signal for performing sequence control to the machine tool, and a tool number in use may be used as observation data. Various types of sensor information such as of temperature or acceleration may further be acquired as observation data.

The execution status acquisition unit 12 acquires the execution status data including an execution position, a specific parameter value and the like from a machining program with respect to the machine tool at a predetermined sampling cycle along with time information, and stores them in the storage unit 20. It is noted that although the sampling cycle of the execution status data may be different from the sampling cycle of the observation data, the time information is acquired from the same clock or a synchronized clock.

The execution status data of a machining program acquired by the observation apparatus 1 includes, for example, an ID or a name of the machining program, a sequence number in the machining program, a line number, a block number and the like as an execution position. The execution status data may further include an ID or a name of a tool as a specific parameter value relating to a configuration change in the machine tool. The parameter value may include command codes, for example, a G code for instructing movement of a table or a tool, and an M code for instructing an auxiliary operation such as of rotation of a spindle or a turning-on/-off operation of cutting oil, and may further include an internal processing status of the numerical controller, such as an in-position check waiting state at the time of positioning.

The extraction unit 13 extracts the time range of the observation data corresponding to the operation of the machine having a possibility of generating a waiting time, on the basis of first conditions relating to the observation data. The first conditions indicate the causal operations relating to the times each at which a waiting time is likely to occur, for example, before and after tool exchange, after spindle speed reaching target speed, during timing adjustment with peripheral equipment, after feed axis reaching in-position, and after completion of auxiliary operation.

Specifically, the following items are preset for respective operations as the first conditions.

(1) Before and After Tool Exchange

Spindle speed is around 0.

Position of a tool in Z axis has moved in the direction of the tool moving away by a distance further than a specified distance.

Tool number has been changed.

(2) After Spindle Speed Reaching Target Speed

The measured spindle speed value is around a target value.

The speed reach signal of a spindle is turned on.

(3) During Timing Adjustment with Peripheral Equipment

The operation completion signal corresponding to a feedback signal from peripheral equipment is turned on.

(4) After Feed Axis Reaching In-Position

The position coordinate of a feed axis is around a target value.

A positioning completion signal is turned on.

(5) After Completion of Auxiliary Operation

An auxiliary operation completion signal is turned on.

In addition, the extraction unit 13 specifies the execution status data that satisfies second conditions relating to the execution status data, and extracts the time range that corresponds to the time information of the specified execution status data and also satisfies the first conditions, thereby improving retrieval accuracy.

Specifically, the following items are preset for respective operations as the second conditions.

(1) Before and After Tool Exchange

Command code for tool exchange in program (2) After Spindle Speed Reaching Target Speed Command code for spindle operation in program (3) During Timing Adjustment with Peripheral Equipment Command code to peripheral equipment in program.

(4) After Feed Axis Reaching In-Position

Command code for feed axis operation in program (5) After Completion of Auxiliary Operation Command code for auxiliary operation in program Other conditions relating to the execution position of program, for example, a change point in a sequence number, may be set in addition to the above conditions, as the second conditions.

The extraction unit 13 may further extract, as information on the time range, the time that is adjacent to the time range relating to the extracted specific operation, and also satisfies third conditions relating to the observation data indicating a waiting time. The state in which none of drive axes change in the statuses thereof is preset as the third conditions, for example, the state in which a feed axis is stopped and a spindle is driven at a constant speed, whereby the extraction unit 13 is able to extract the time that highly possibly corresponds to a waiting time.

The output unit 14 outputs the information on the time range extracted by the extraction unit 13, along with the information on other times in the manner that they are distinguished mutually. Specifically, after reading out the observation data and the execution status data from the storage unit 20, the output unit 14 synchronizes the time information of the both data with each other, and associates the waveform graphs of the observation data including the extracted time range with the execution status data in time series, thereby displaying the both data.

In this case, the output unit 14 may display the extracted time range with a display attribute distinguished from other times. Various ways of distinguishing the attribute are available. In an example, the waveform in the extracted time range is displayed with a different line type, a different color, or a different thickness, the background in the extracted time range is displayed with a different color, the extracted time range is highlighted, or the extracted time range is displayed in a frame. In the case of graphically displaying the observation data in time series, the output unit 14 may display the graph enlarged or reduced in any coordinate axis direction according to a predetermined instruction input by a user.

Figure 2:
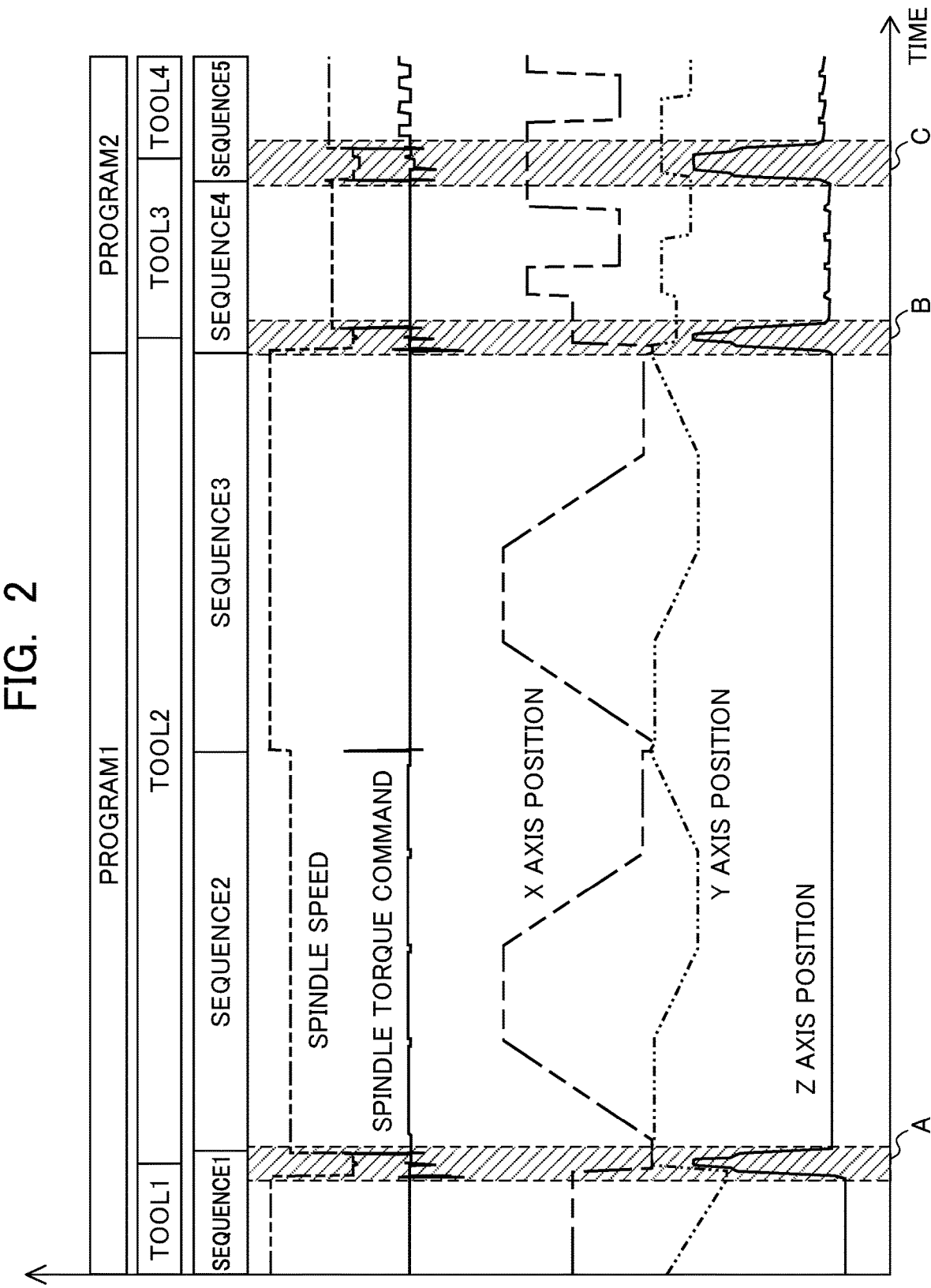
FIG. 2 is a diagram illustrating a display example of observation data according to the embodiment.

FIG. 2 is a diagram illustrating a display example of the observation data according to the present embodiment. In the present example, data in time series of a spindle speed, a spindle torque command, an X axis position, a Y axis position, and a Z axis position is displayed in waveform graphs as observation data.

The execution status data of the machining programs is also displayed in synchronization with the waveform graphs of the observation data in time series along the same time axis as the observation data. In the present example, tool names are displayed in addition to program names and sequence numbers in synchronization with the observation data, as execution status data.

As described above, for example, the point at which tools are exchanged is specified as the time range that satisfies the conditions such as "Spindle speed is around 0," "Position of a tool in Z axis has moved in the direction of the tool moving away by a distance further than a specified distance," "Tool number has been changed," "Command code for tool exchange in program," and the like. In other words, in the region where the waveform graphs are displayed in the figure, a region A, a region B, and a region C are presented as the time ranges satisfying the conditions.

Figure 3:
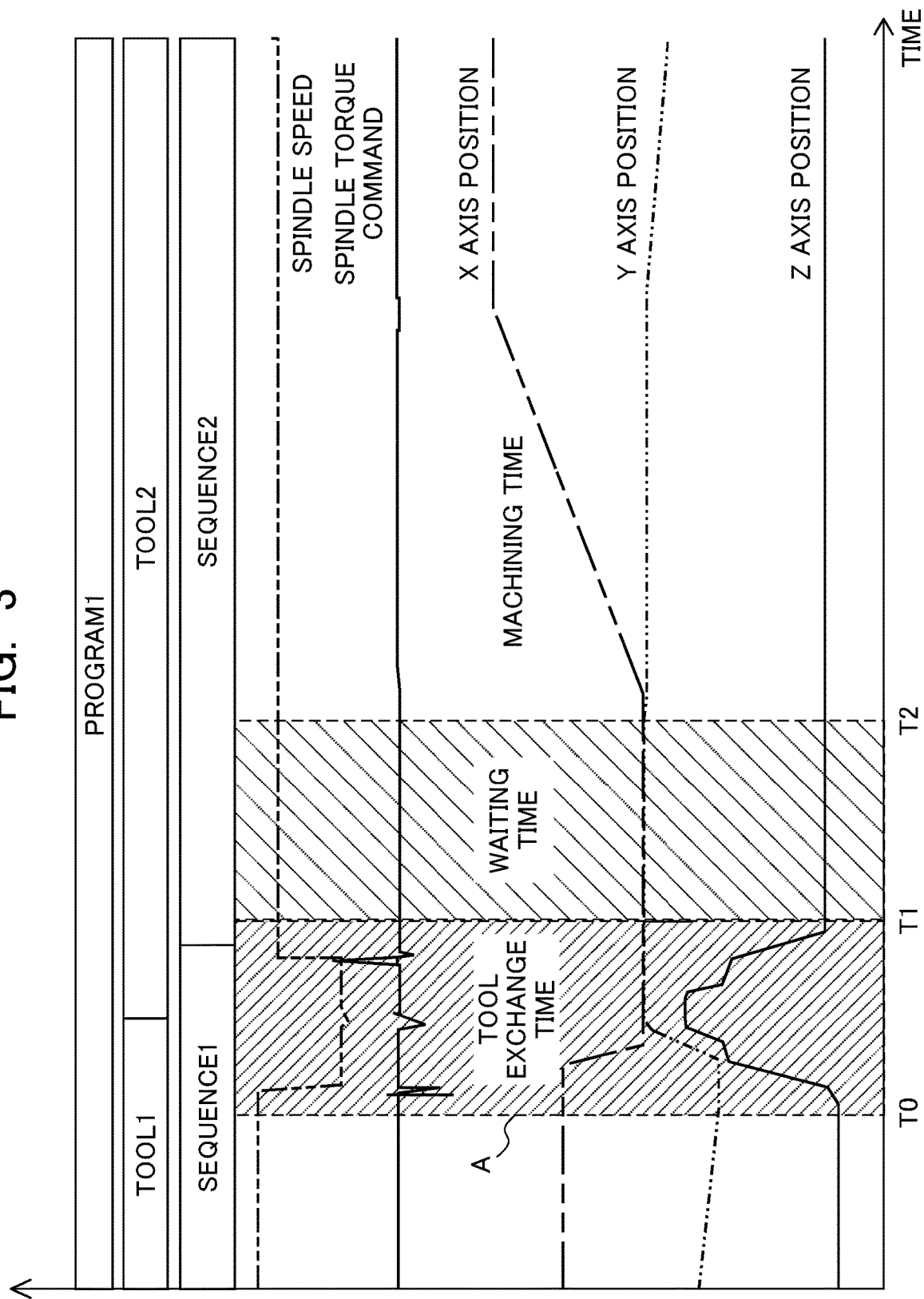
FIG. 3 is a diagram illustrating an enlarged display example of the observation data according to the embodiment.

FIG. 3 is a diagram illustrating an enlarged display example of the observation data according to the present embodiment. In the present example, a part including the region A out of the waveform graphs of FIG. 2 is enlarged in the time axis direction. In the displayed period, the waiting time (from a time T1 to a time T2) during which the respective axes are stopped occurs after the tool exchange time (from a time T0 to the time T1), and thereafter the X axis and the Y axis move, whereby the machining operation is started.

In this way, the time range for tool exchange and the time determined as the waiting time thereafter are presented, whereby a user is able to confirm the wasteful waiting time by referring to the observation data and the execution status data in this time zone.

The method of displaying information on a time range by the output unit 14 is not limited to this. In an example, the output unit 14 may output only the time information such as the start and the end of the extracted time range, and the start and the end of the time determined as the waiting time. The output destination of the output unit 14 is not limited to a display. The output unit 14 may perform the output by printer output, file output, data transmission, or the like.

According to the present embodiment, the observation apparatus 1 acquires observation data on an operation status of a machine, and extracts the time range corresponding to the specific operation having a possibility of generating a wasteful waiting time, on the basis of the first conditions relating to the observation data. The observation apparatus 1 outputs the information on the time range, thereby enabling to present a point of interest for finding a wasteful waiting time of the machine. As a result, the burden on the user for analyzing the observation data is reduced, and accordingly the work for shortening a cycle time is able to be performed in a short time.

The observation apparatus 1 acquires the execution status data including an execution position and a parameter value from an instruction program with respect to the machine, and extracts the time range satisfying the second conditions relating to the execution status data. Accordingly, the observation apparatus 1 is able to accurately extract the time range corresponding to a specific operation, by using both the observation data and the execution status data.

The observation apparatus 1 uses, as the first conditions, the conditions indicating at least any one of the operations of: tool exchange; spindle speed reaching target speed; timing adjustment with peripheral equipment; feed axis reaching in-position; and completion of auxiliary operation. Accordingly, the observation apparatus 1 is able to efficiently extract the point at which a wasteful waiting time is likely to occur, thereby enabling to present the point to a user.

The observation apparatus 1 extracts the time that is adjacent to the time range corresponding to a specific operation and also satisfies the third conditions relating to the observation data, as the time that possibly corresponds to a wasteful waiting time. As a result, the wasteful waiting time that is likely to occur before and after a specific operation is able to be presented to a user, whereby the user is able to efficiently perform confirmation work.

The observation apparatus 1 displays the information on the extracted time range with a display attribute distinguished from other times, thereby enabling to improve visibility and efficiency in the user's work. The observation apparatus 1 outputs the observation data as time-series waveform graphs, thereby assisting the user in data analysis. The observation apparatus 1 allows an enlarging or reducing operation of the waveform graphs, thereby improving convenience.

Although the embodiment of the present invention has been described so far, the present invention is not limited to the above-described embodiment. The effects described in the present embodiment are listed merely as the most preferable effects produced by the present invention. The effects by the present invention are not limited to those described in the present embodiment.

A machine to be observed by the observation apparatus 1 of the present embodiment is not limited to a machine tool including a cutting machine, a laser beam machine, an electric discharge machine, etc. The present embodiment can also be applied to industrial machines including an industrial robot.

The observation method executed by the observation apparatus s realized by software. In the case where the method is realized by software, programs included in the software are installed in the computer. These programs may be stored in a removable medium and distributed to a user, or may be downloaded and distributed to the user's computer via a network.

EXPLANATION OF REFERENCE NUMERALS

1 OBSERVATION APPARATUS
10 CONTROL UNIT
11 OBSERVATION DATA ACQUISITION UNIT
12 EXECUTION STATUS ACQUISITION UNIT
13 EXTRACTION UNIT
14 OUTPUT UNIT
20 STORAGE UNIT

What is claimed is:

1. An observation apparatus comprising:
   an observation data acquisition unit configured to acquire observation data on an operation status of a machine along with time information;
   an extraction unit configured to extract, on a basis of a first condition relating to the observation data, a time range of the observation data corresponding to an operation of the machine, the operation generating a waiting time; and
   an output unit configured to output information on the time range.

2. The observation apparatus according to claim 1, the observation apparatus comprising:
   an execution status acquisition unit configured to acquire execution status data including an execution position and a specific parameter value from an instruction program with respect to the machine, along with time information, wherein
   the extraction unit specifies the execution status data satisfying a second condition relating to the execution status data, and extracts the time range corresponding to the time information of the specified execution status data and also satisfying the first condition.

3. The observation apparatus according to claim 1, wherein
   the first condition indicates at least one operation of tool exchange, spindle speed reaching target speed, timing adjustment with peripheral equipment, feed axis reaching in-position, and completion of auxiliary operation.

4. The observation apparatus according to claim 1, wherein
   the extraction unit further extracts, as information on the time range, a time being adjacent to the time range and also satisfying a third condition relating to the observation data indicating the waiting time.

5. The observation apparatus according to claim 1, wherein
   the output unit displays, on a display, the information on the time range with a display attribute of the time range distinguished from other times.

6. The observation apparatus according to claim 5, wherein
   the output unit outputs the observation data as a time-series waveform graph including the time range.

7. The observation apparatus according to claim 6, wherein
   the output unit enlarges the waveform graph in any coordinate axis direction, according to a predetermined instruction input.

8. An observation method to be executed by a computer, the observation method comprising:
   an observation data acquisition step of acquiring observation data on an operation status of a machine, along with time information;
   an extraction step of extracting, on a basis of a first condition relating to the observation data, a time range of the observation data corresponding to an operation of the machine, the operation generating a waiting time; and
   an output step of outputting information on the time range.

9. A non-transitory computer-readable medium storing an observation program to be executed by a computer, the observation program comprising:
   an observation data acquisition step of acquiring observation data on an operation status of a machine, along with time information;
   an extraction step of extracting, on a basis of a first condition relating to the observation data, a time range of the observation data corresponding to an operation of the machine, the operation generating a waiting time; and
   an output step of outputting information on the time range.

* * * * *